(12) United States Patent
Mishra et al.

(10) Patent No.: US 8,744,886 B1
(45) Date of Patent: Jun. 3, 2014

(54) SYSTEMS AND METHODS FOR RECORDING DEFECTS

(75) Inventors: Devesh Mishra, Snoqualmie, WA (US); Eric C. Young, Mercer Island, WA (US); Timothy Jesse Tien, Seattle, WA (US); Jun Zhao, Bellevue, WA (US); Sameer Vinod Shah, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 515 days.

(21) Appl. No.: 12/329,821

(22) Filed: Dec. 8, 2008

(51) Int. Cl.
*G06Q 10/00* (2012.01)
*G06F 7/00* (2006.01)

(52) U.S. Cl.
USPC .......................... 705/7.12; 705/7.16; 700/219

(58) Field of Classification Search
USPC ................................ 705/7.11–7.42; 700/219
See application file for complete search history.

(56) References Cited

U.S. PATENT DOCUMENTS

| | | | | |
|---|---|---|---|---|
| 4,691,830 A | * | 9/1987 | Ahl et al. | 209/523 |
| 5,896,294 A | * | 4/1999 | Chow et al. | 700/121 |
| 5,935,285 A | * | 8/1999 | Lucas | 65/29.12 |
| 6,240,633 B1 | * | 6/2001 | Kent et al. | 29/832 |
| 6,483,938 B1 | * | 11/2002 | Hennessey et al. | 382/149 |
| 6,687,633 B2 | * | 2/2004 | Ono et al. | 702/83 |
| 7,218,974 B2 | * | 5/2007 | Rumi et al. | 700/28 |
| 7,607,545 B2 | * | 10/2009 | Daniel | 209/523 |
| 2002/0155628 A1 | * | 10/2002 | Bulaga et al. | 438/14 |
| 2004/0086168 A1 | * | 5/2004 | Kuwabara | 382/145 |
| 2005/0027656 A1 | * | 2/2005 | Tobler et al. | 705/53 |
| 2006/0049252 A1 | * | 3/2006 | Guyett et al. | 235/386 |
| 2006/0149407 A1 | * | 7/2006 | Markham et al. | 700/108 |
| 2008/0300809 A1 | * | 12/2008 | Yang et al. | 702/81 |

OTHER PUBLICATIONS

Fine et al. "Managing Quality Improvement" (1984) Sloan School of Management, Massachusetts Institute of Technology, p. 1-50.*

* cited by examiner

*Primary Examiner* — Justin M Pats
*Assistant Examiner* — Sujay Koneru
(74) *Attorney, Agent, or Firm* — Thomas | Horstemeyer, LLP (57) ABSTRACT

Disclosed are various systems, methods, and other embodiments for processing and recording defects. In one embodiment, an application is executed in a server that processes and records defects detected by a user at a receiving station client. Based on a retrieved vendor profile, the application selects an inspection sequence for a user to execute. The inspection sequence is selected based on a history of defects specified in the vendor profile. The application also determines whether supervision is needed based on the performance of the user.

22 Claims, 9 Drawing Sheets

Receiving Station 10
User: John Smith

*Login*
*Logout*

Log of Defects

| DEFECT TYPE | PO NO. | PRODUCT ID | RECEIVER | TIME STAMP |
|---|---|---|---|---|
| ○ WRONG BINDING | Q9864135 | 0934316710 | jsmith | 18:52 3/26/08 |
| ○ INCORRECT TITLE | Q9224135 | 0931418312 | jsmith | 18:54 3/26/08 |
| ● WRONG BINDING | Q9536331 | 0923516710 | jsmith | 19:02 3/26/08 |
| ○ PROD. ID NOT FOUND | Q2158220 | 0000000000 | jsmith | 19:07 3/26/08 |
| ○ WRONG BINDING | Q9231135 | 0921431510 | jsmith | 19:27 3/26/08 |

Click on a defect to research and press SUBMIT.

SUBMIT

\*\* Please see your supervisor before proceeding.

SYSTEMS AND METHODS FOR RECORDING DEFECTS

BACKGROUND

Materials handling facilities, such as product distribution or fulfillment centers, process a large amount of inventory. As such, a significant amount of resources may be required in tracking defective products. Generally, for a received parcel that is defective, a user sets aside the defective product so that the product is not received into inventory. A defective parcel may include a damaged package or product, defective tracking information, such as an inaccurate, missing, or illegible purchase order (PO) or vendor information, or other shipment errors. Ensuring that the appropriate information has been captured for incoming parcels at a materials handling facility and recording exceptions for such parcels can be burdensome and expensive.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

When a user sidelines a defective product, the user typically fills out a problem slip of some type and records details relevant to the defect. A problem solver may later receive the defective product and attempt to address the defect based on the problem slip. However, there are various perceived shortcomings with this approach. The defect is manually logged and is not tracked by the system in an automated fashion. As such, there is no consistent way of tracking incoming parcels upon arrival at the fulfillment center. Upon manually generating a problem slip, the user typically places the defective product into a defects bin. There is, however, very little visibility from a system level regarding the location of defective products. Another perceived shortcoming is that the user typically has little incentive to fill out a problem slip as this can be a time consuming process. The time spent in filling out problem slips is generally not accounted for in the actual performance of a user. This can lead to incomplete or inaccurate problem slips being generated.

Various embodiments are described for accurately and efficiently recording defects found in incoming parcels. To this end, the various embodiments ensure reliable delivery of products into a defects bin or into inventory, as will be described in greater detail below. Furthermore, various embodiments incorporate quality control measures by both evaluating performance of a user and determining when supervision is needed.

Figure 1:
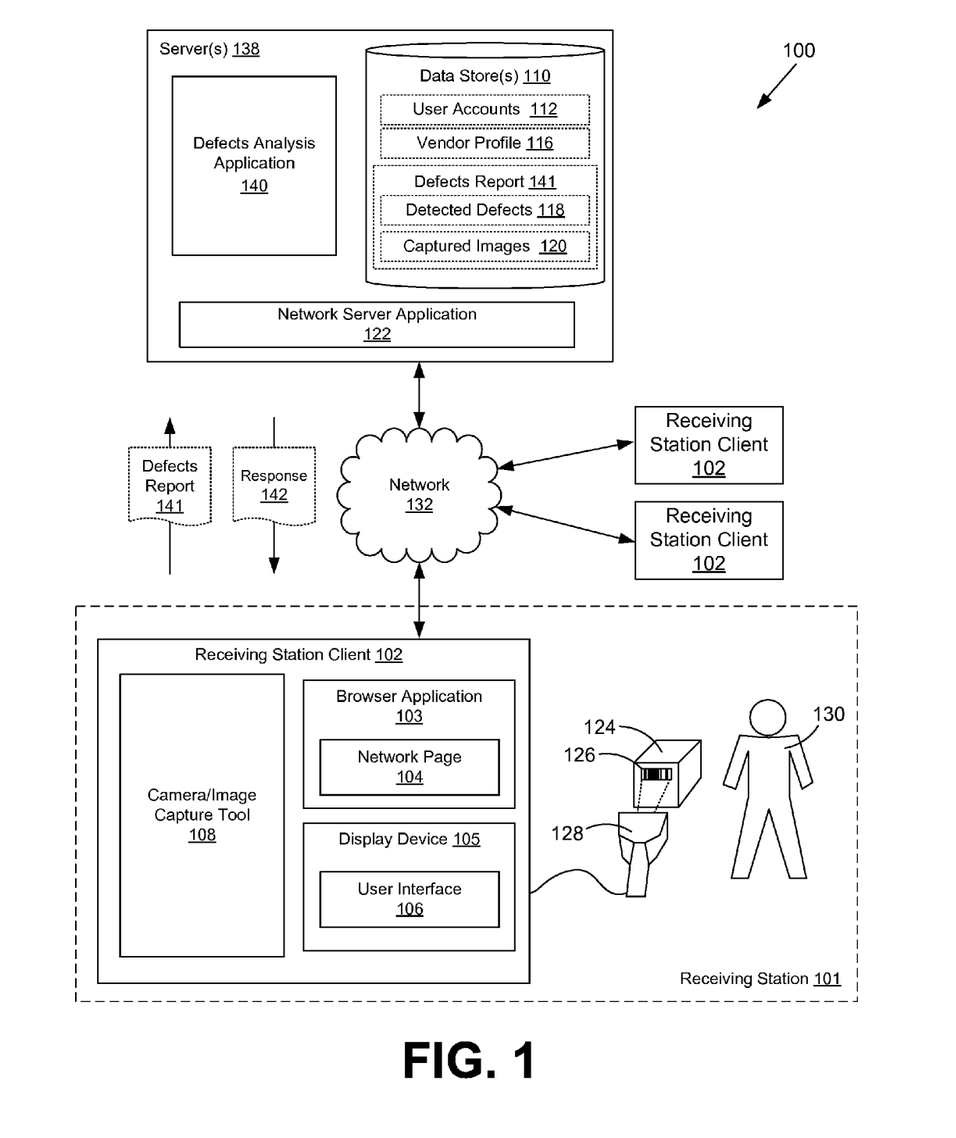
FIG. 1 is a drawing of a networked environment according to an embodiment of the present disclosure.

In the following discussion, a description of the various components of a networked environment is described, followed by a discussion of the operation thereof. With reference to FIG. 1, shown is a networked environment 100 showing at least one server 138 implementing a defects analysis application 140 and at least one receiving station client 102. The server 138 may represent one or more servers that may be configured to work in coordination with each other. Alternatively, such servers 138 may be arranged in some other manners, as can be appreciated.

In accordance with various embodiments, the networked environment 100 includes one or more servers 138 that communicate with one or more receiving station clients 102 via the network 132. The network 132 includes, for example, the Internet, intranets, wide area networks (WANs), local area networks, wireless networks, or other suitable networks, etc., or any combination of two or more such networks. The server 138 may comprise one or more server computers arranged in a server bank or other arrangement. Furthermore, the server 138 may be arranged in a single location or may be arranged in a distributed configuration comprising multiple servers located across different geographical areas.

The server 138 is employed to execute various applications such as, for example, a defects analysis application 140 and a network server application 122. Associated with the one or more servers 138 is a data store 110 which stores various data or files that are accessed by the defects analysis application 140 for processing and recording defective products, as will be described later in this disclosure. As shown in FIG. 1, the data store 110 stores user account information 112 associated with users 130 of the receiving station client 102. Such user account information 112 may comprise the name of the user 130 and contact information in addition to a record of past performance of the user 130 relating to detection of defective parcels. User account information 112 may further comprise an indicator of the experience level of the user 130.

In accordance with some embodiments, the data store 110 may further store received defects reports 141, each of which may comprise a vendor profile 116, one or more detected defects 118, and captured images 120 of the defective product. For purposes of this disclosure, a "defect" or "exception" refers to any of a variety of conditions including, but not limited to, unknown product identifiers, product identifiers that link to multiple items, and incorrect titles (e.g., where the parcel title does not match the title of the item within the parcel). The vendor profile 116 comprises information relating to a particular vendor. Such information may comprise, for example, a history of defective products associated with that particular vendor. For some embodiments, the vendor profile 116 may also contain vendor information that can be used for requesting charge-backs from vendors for defected products.

The defects analysis application 140 is employed to receive a defects report 141 generated at the receiving station client 102 and provide a response 142 to the receiving station client 102. Such a response 142 may comprise, for example, guidelines or a sequence of steps for addressing the detected defect 118. As another non-limiting example, the response 142 may also comprise an acknowledgement from the server 138 that a defects report 141 has been received. The network server application 122 in the server 138 facilitates communication with various applications on the receiving station client 102 including a browser application 103, which renders a network page 104 to a user 130. In particular, the browser application 103 may be executed in a receiving station client 102 for accessing and rendering network pages 104 such as web pages or other network content generated by the one or more servers 138. The network page 104 facilitates the inspection process conducted by the user 130. As a non-limiting example, the user 130 may receive step-by-step instructions via the network page 104 for inspecting a parcel 124.

Network pages 104 may be generated dynamically, for example, based upon the network page 104 data and other data stored in the data store 110. In accordance with some embodiments, the browser application 103 interfaces with the network server application 122 and the defects analysis application 140 in order to obtain a network page 104. The network page 104 is implemented by the browser application 103 and generates a user interface 106 on a display device 105 associated with the receiving station client 103. As depicted in FIG. 1 by the dashed boundary line, a receiving station 101 generally comprises both a receiving station client 102 and a user 130 who handles incoming parcels. In particular, the receiving station client 102 includes a display device 105 and a user interface 106 for guiding a user 130 through an inspection process for an incoming parcel 124. The user 130 may also manipulate the user interface 106 to generate a defects report 141. For some embodiments, the user 130 may also utilize the user interface 106 to enter comments for the defects report 141.

The receiving station client 102 may also include a barcode reader 128 for scanning a product identifier 126 on an incoming parcel 124. It should be noted, however, that while a barcode reader 128 is depicted in FIG. 1, other input devices may also be used. Such input devices may include a keyboard, mouse, microphone, or other device. Based on the scanned product identifier 126, the server 138 retrieves a vendor profile 116 associated with the product identifier 126 from the data store 110. As described earlier, the server 138 selects an inspection sequence for the user 130 to execute based on the vendor profile 116. For example, if a particular vendor profile 116 reflects that a particular vendor has a past history of defects, a higher level of scrutiny may be applied during the inspection process. In this regard, the server 138 selects an appropriate inspection sequence, which may be rendered as a network page 104 at the receiving station client 102. The network page 104 guides the user 130 through the selected inspection process.

The receiving station client 102 further comprises a camera 108 or some type of image capture tool 108 for capturing images of defective products. In particular, the camera 108 associated with the receiving station client 102 is used to input an image 120 taken of the defective product as proof of the condition of such shipment when received. The captured image 120 may be bundled with other information and sent by the receiving station client 102 in the form of a defects report 141. As depicted in FIG. 1, the receiving station client 102 may represent one or more clients configured to access information on the server 138. The receiving station client 106 may comprise, for example, a mobile processor based system such as, for example, a personal digital assistant, laptop, cellular telephone with processing capability, or other device.

Figure 2:
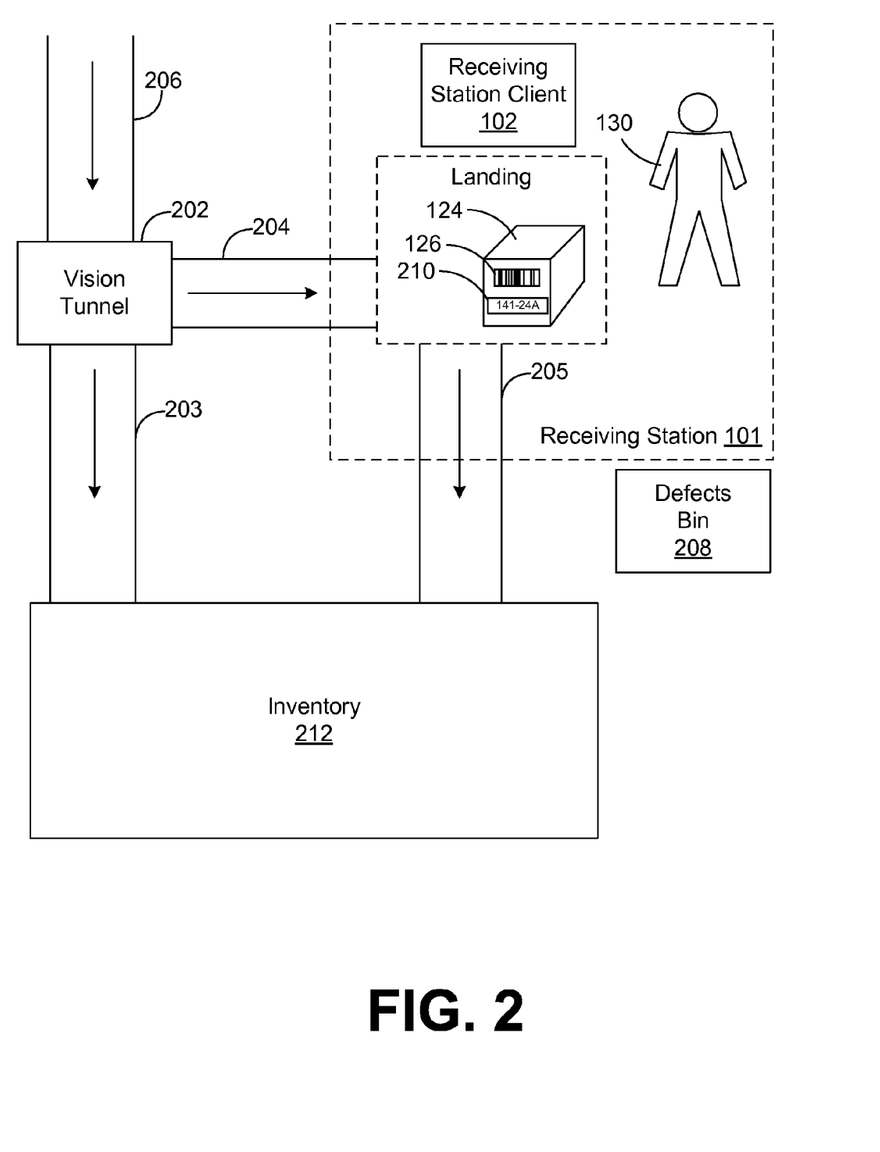
FIG. 2 is a drawing illustrating an exemplary flow of a shipment parcel processed through a receiving station client in the networked environment of FIG. 1 according to an embodiment of the present disclosure.

FIG. 2 is a drawing illustrating an exemplary flow of a shipment parcel through the receiving station client 102 in the networked environment 100 of FIG. 1 according to an embodiment of the present disclosure. For some embodiments, an incoming parcel 124 at a materials handling facility may enter a vision tunnel 202 on a conveyor belt 206. The vision tunnel 202 generally tracks incoming parcels 124 and performs such functions as scanning tracking information and scanning for high-level defects. The vision tunnel 202 takes images 120 of all sides of an incoming parcel 124 and confirms that a particular shipment has been received. In accordance with some embodiments, if the vision tunnel 202 does not detect an issue with an incoming parcel 124, then the vision tunnel 202 interfaces with the server 138 and based on the vendor profile 116 (FIG. 1), determines whether the associated vendor has a history of recorded defects. If the vendor has a clean history, the incoming parcel 124 passes through the vision tunnel 202 and to inventory 212 via a "fast track" path on conveyor belt 203. If, however, the vision tunnel 202 detects an issue with an incoming parcel 124 or if the vendor has a past history of recorded defects, the incoming parcel is sidelined and passed to the receiving station 101 on the conveyor belt 204 for a more in depth inspection. In this regard, incoming parcels 124 received from certain vendors with prior histories of defects, for example, can be monitored with a higher level of scrutiny during a probation period. It should be noted that while FIG. 2 depicts parcels 124 being received first at a vision tunnel 202 before being forwarded to the receiving station 101, incoming parcels may also be routed directly to the receiving station 101. It is understood that all such variations are within the scope of the present disclosure.

At the receiving station 101, the user 130 receives the sidelined parcel 124 on a landing, for example, and scans the product identifier 126, thereby entering the same into the system. The user 130 opens the parcel 124, and the item in the parcel 124 undergoes an inspection process, as selected by the server 138 (FIG. 1). If a defect 118 is detected during the inspection process, a defects report 141 is generated at the receiving station 101 and sent to the server 138. The server 138 generates a corresponding product defect identifier 210 for tracking purposes. The user 130 places the product defect identifier 210 which may be in the form of a case sticker, for example, onto the defective parcel 124. The server 138 then generates instructions which are rendered at the receiving station client 102 instructing the user 130 to place the defective parcel 124 in a defects bin 208. In the event that the defect 118 can be resolved, the user 130 may be instructed to forward the parcel 124 to inventory 212 via the conveyor belt 205.

Figure 3:
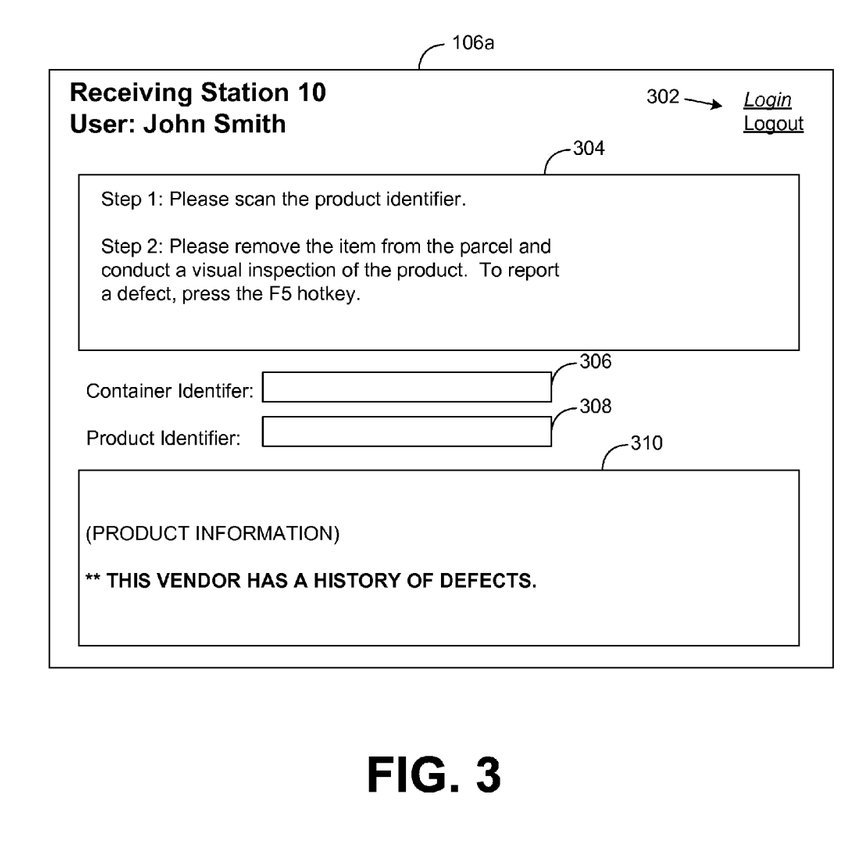
FIGS. 3-4 are drawings that depict examples of user interfaces rendered in a receiving station client in the networked environment of FIG. 1 according to an embodiment of the present disclosure.

FIG. 3 is a drawing of one example of a user interface 106*a* according to various embodiments. Referring back briefly to FIG. 1, a user interface 106 is rendered on a display device 105 associated with a respective receiving station client 102 based upon a network page 104, as implemented by a browser application 103. Alternatively, the user interface 106 may be generated on the display device 105 via some other application. With reference now to FIG. 3, the user interface 106*a* depicted includes a user login link 302 that a user 130 utilizes to enter login information. The login information may be received at the server 138 (FIG. 1) and used to retrieve user account information 112. For the example shown in FIG. 3, the name of the user 130 is "John Smith," and "Receiving Station 10" is being utilized as the receiving station 101 (FIG. 2) for the inspection process.

An instruction box 304 is depicted which provides the user 130 with step-by-step instructions based on the inspection process selected by the server 138 (FIG. 1). The user interface 106a may include a container identifier 306, which corresponds to a container holding one or more parcels 124. A product identifier box 308 displays product identification when the user scans or otherwise enters the product identifier 126 located on an incoming parcel 124. Also, a product information box 310 is included, which provides detailed product information. Such product information may comprise, for example, the title of the item contained in the parcel 124 and the vendor associated with the item or other information. In accordance with some embodiments, the product information box 310 may also provide an indication that the vendor associated with the item has a past history of defects. This alerts the user 130 to apply a higher level of scrutiny in performing the inspection process.

Figure 4:
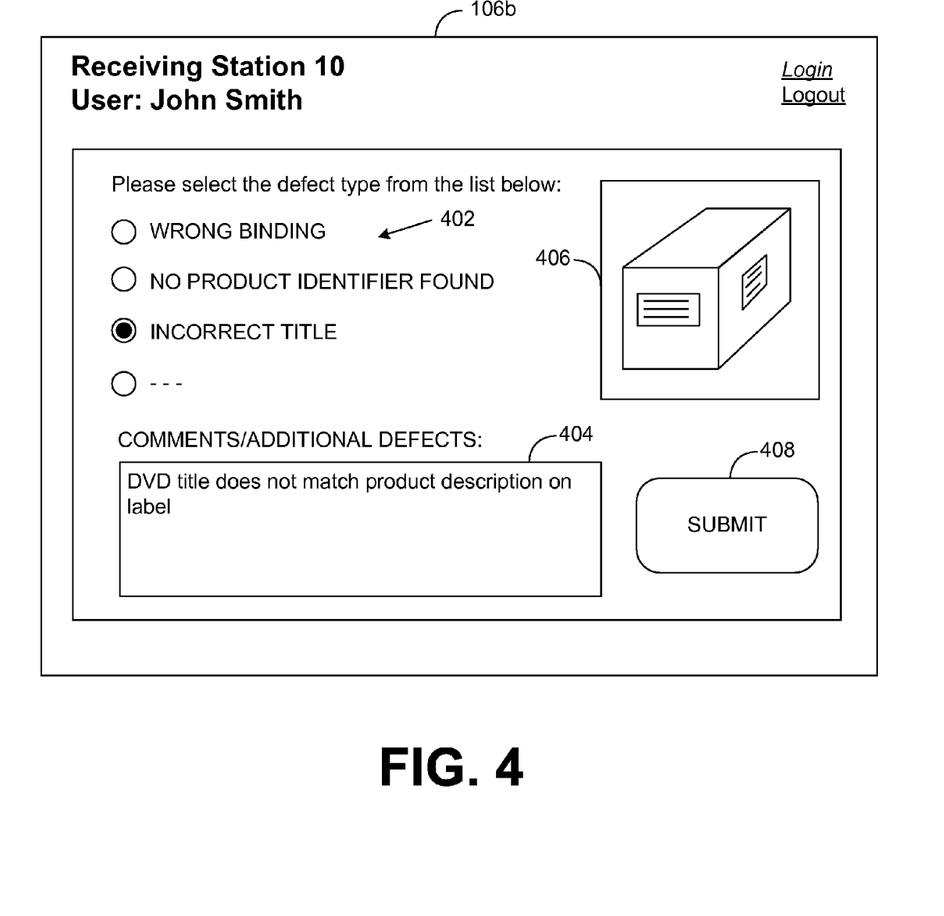

Reference is now made to FIG. 4, which depicts an example of a user interface 106b in accordance with some embodiments that a user 130 manipulates in order to generate a defects report 141 (FIG. 1). For some embodiments, a list of exceptions is generated by the defects analysis application 140 at the server 138 (FIG. 1) and rendered at the receiving client station 102 (FIG. 1) from which the user 130 may select. The list of exceptions may be generated, for example, in response to a hotkey (e.g., "F5") being pressed, for example. In particular, the user 130 presses the hotkey to alert the server 138 (FIG. 1) that a defect has been detected during the inspection process. In the non-limiting example shown, the user interface 106b includes a series of buttons 402 corresponding to different exceptions from which the user 130 may select. For example, the user 130 may indicate that the item within a particular parcel 124 has an incorrect title by manipulating the third button. As another example, the user 130 may find that a parcel 124 does not have a product identifier 126. The user 130 thus manipulates the button corresponding to "No Product Identifier Found." For some embodiments, multiple buttons 402 may be manipulated at the same time to indicate that multiple defects are detected.

The user interface 106b may also include a comments box 404 which allows the user 130 to manually type in a description of the defect. Once the one or more exceptions are selected, the user 130 clicks on the submit button 408 to record and generate a defects report 141. As part of the inspection process, the user 130 may also be instructed to capture an image 406 of the defective parcel 124. As described earlier, the camera 108 (FIG. 1) associated with the receiving station client 102 is used to input an image taken of the defective parcel 124 as proof of the condition of such parcel 124 when received. The image 406, along with the selected exceptions, are captured in a defects report 140. The defects report 141 is received by the server 138 and archived in the data store 110 (FIG. 1).

In accordance with various embodiments, quality control of the performance of the user 130 is carefully maintained in order to normalize the detection process. In this regard, the performance of each user 130 is carefully monitored and based on the past performance of each user 130, and a determination is made on whether supervision is needed. For example, due to inexperience on the part of a particular user 130, the user 130 may require additional training due to an unacceptable rate of false detections. For some embodiments, determining whether supervision is required involves determining a current rate of detected defects 118 reported by the user 130, where the current rate is based on a number of defects reported by the user 130 over a predetermined period of time.

Figure 5A:
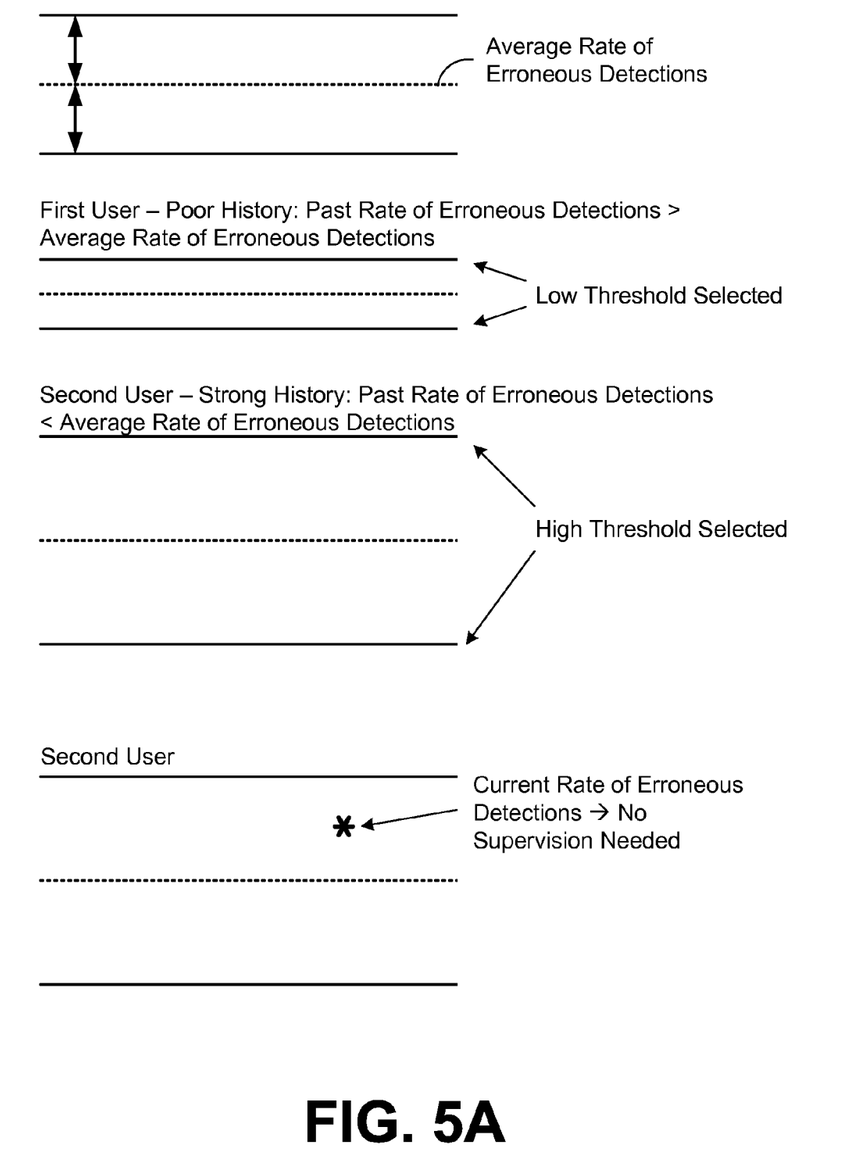
FIGS. 5A-B are drawings illustrating a selection of various thresholds according to an embodiment of the present disclosure.

The past rate of erroneous detections of the user 130 is also examined. In particular, a threshold is specified based on a comparison of the past rate of erroneous detections of the user 130 and an average rate of erroneous detections associated with a plurality of users. In this regard, a relative comparison is made between the past performance of the user 130 and the past performance of all other users. By way of illustration, reference is made to FIG. 5A. As shown, a relatively low threshold is specified when the past rate of erroneous detections of the user 130 is greater than the average rate of erroneous detections, and a relatively high threshold is specified when the past rate of erroneous detections of the user 130 is less than the average rate of erroneous detections. Supervision is needed when the current rate of detected defects 118 is greater than the threshold, and supervision is not needed when the current rate of detected defects 118 is within a tolerance level or region defined by the specified threshold, as illustrated at the bottom of FIG. 5A.

Figure 5B:
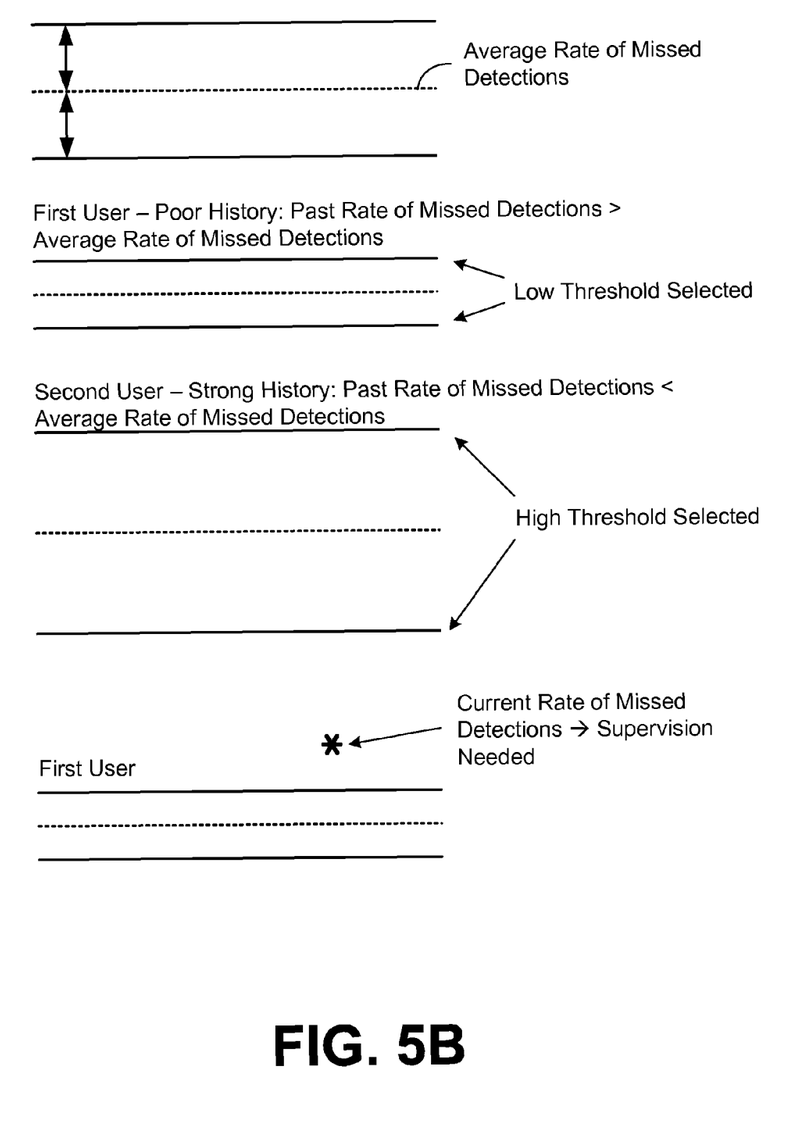

Likewise, if the past performance of a user 130 indicates that the user 130 has a history of missing defects, supervision may also be needed. As such, a relative comparison is made between the past performance of the user 130 regarding missed defects and the past performance of all other users regarding missed defects is also performed. With reference to FIG. 5B, a relatively low threshold is specified when the past rate of missed detections of the user 130 is greater than the average rate of missed detections, and a relatively high threshold is specified when the past rate of missed detections of the user 130 is less than the average rate of missed detections. As an example, suppose a user 130 has a past rate of missed detections of 15 misses for every 100 defects. Suppose also that the average rate of missed detections among all other users is just 2 misses for every 100 defects. In this non-limiting example, a relatively low threshold is associated with the user 130 as the user 130 has a past rate of missed detections that is greater than the average rate of missed detections. As illustrated at the bottom of FIG. 5B, supervision is needed when the current rate of missed defects is outside a tolerance level or region defined by the specified.

Figure 6:
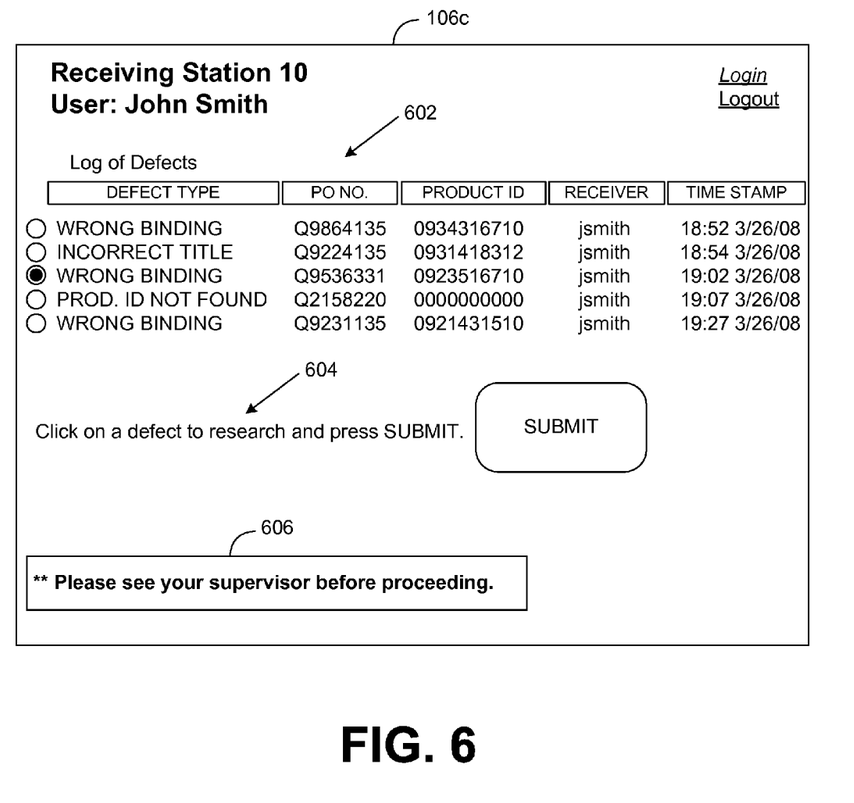
FIG. 6 is a drawing that depicts an example of a user interface rendered in a receiving station client in the networked environment of FIG. 1 according to an embodiment of the present disclosure.

Reference is now made to FIG. 6, which is a drawing of a user interface 106c for reviewing defects reports 141 generated by a particular user 130. In the example user interface 106c shown, a given user 130 (i.e., John Smith) has generated a number of defects reports 602. As described above, the current rate of detected defects 118 is based on the number of defects reports 602 generated over a predetermined period of time (e.g., 30 minutes). The experience level of the user 130 is also taken into consideration. As a non-limiting example, suppose the user 130 John Smith has only 1 month of experience and has generated 5 defects reports 602 over the span of 30 minutes. Suppose also, that John Smith has a higher or lower past rate of erroneous detections relative to the average rate of erroneous detections. The average rate of erroneous detections may be based, for example, on all the users within the same materials handling facility or within a particular region. Based on this information, a threshold is specified. Since John Smith has a past rate of erroneous detections that is higher than the average rate, a lower threshold is assigned to John Smith. In this regard, a lower tolerance level is assigned to John Smith due to his lower performance level and level of inexperience. This threshold is then compared to the current rate of detected defects 118. If the current rate of detected defects 118 is higher than the threshold, supervision is needed.

In accordance with some embodiments, the defects analysis application 140 in the server 138 may generate an output that both indicates that supervision is needed and instructs the receiving station client 102 to halt further activity by the user 130. The defects analysis application 140 may also update the user account information 112 in the data store 110 to reflect that an output indicating that supervision is needed was generated by the server 138. Referring to FIG. 6, a message box 606 may alert the user 130 to inform his supervisor before proceeding. Alternatively, a supervisor may be contacted directly. A supervisor attending to the user 130 may click on one of the buttons 602 shown in FIG. 6 and click on the submit button 604 to further research a defects report 602 generated by the user 130. The supervisor may then re-inspect the tagged parcels 124 to confirm that the parcels are actually defective. In doing so, the performance of all the users 130 is normalized in order to maintain quality control over the inspection process.

Figure 7:
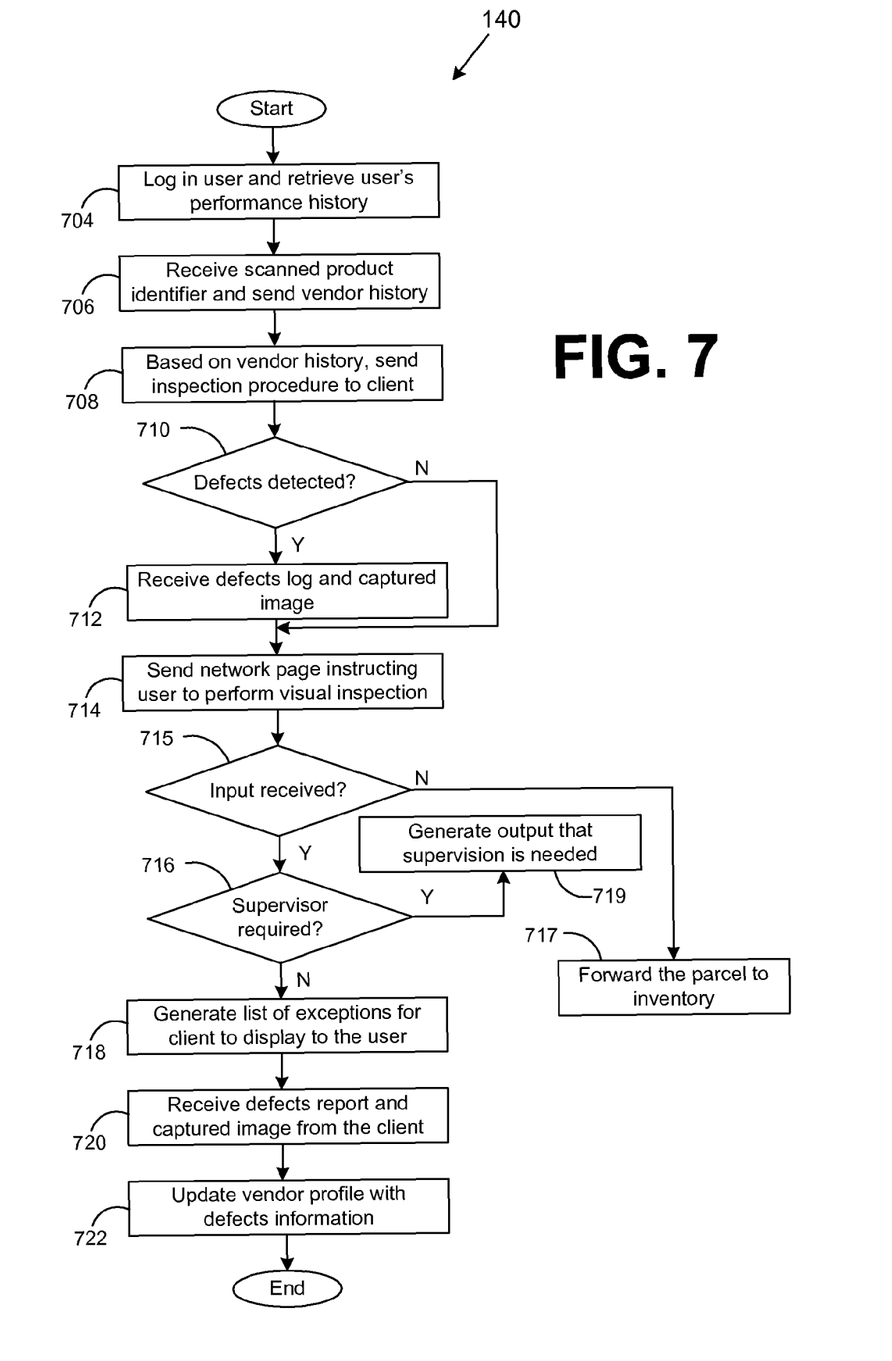
FIG. 7 depicts a flowchart that illustrates one example of functionality associated with a defects analysis application executed in a server in the networked environment of FIG. 1 according to an embodiment of the present disclosure.

Referring next to FIG. 7, shown is one flowchart that shows one example of functionality of the defects analysis application 140 executed in a server 138 in the networked environment 100 of FIG. 1. The flowchart of FIG. 7 may be viewed as depicting example steps of the method implemented in the one or more servers 138 in order to process defects detected at the receiving station clients 102.

Beginning with box 704, the defects analysis application 140 in the server 138 (FIG. 1) logs in a user 130 and retrieves the past performance history of the user 130. The past performance history of the user 130 may be stored as user account information 112 in the data store 110 associated with the server 138. In box 706, the defects analysis application 140 receives a scanned product identifier 126 associated with an incoming parcel 124 received at a receiving station client 102. The defects analysis application 140 retrieves a vendor profile 116 from the data store 110 and sends the vendor profile 116 to the receiving station client 102.

In box 708, the defects analysis application 140 selects an inspection sequence based on the history of defects specified in the retrieved vendor profile 116. Note that depending on whether the vendor has a history of defects, a higher level of scrutiny may be applied during the inspection process. In accordance with some embodiments, the receiving station client 102 where the incoming parcel 124 has been received performs an automated detection of defects. In particular, defects that may be detected by the receiving station client 102 are performed. Such defects may include parcels 124 with unknown titles, parcels 124 with product identifiers that link to multiple items, etc. In decision box 710, the defects analysis application 140 waits until a defect 118 is detected.

Assuming that a defect 118 is detected for the incoming parcel 124 in box 712, the defects analysis application 140 receives a defects report 141 that includes a captured image of the defective parcel 124. In box 714, the defects analysis application 140 sends a network page 104 to be rendered at the receiving client station 102 for instructing the user 130 to perform a visual inspection. Such an inspection may be performed to identify parcels 124 where the parcel title does not match the title of the item within the parcel 124, incorrect binding, etc. In decision box 715, the defects analysis application 140 then waits for an input to be received. For some embodiments, the defects analysis application 140 may wait until a hotkey is pressed by the user 130 at the receiving station client 102. As can be appreciated, other inputs may also be received. If no input is received (e.g., a hotkey is not pressed), then in box 717, the user 130 may be instructed to forward the parcel 124 to inventory 212.

If input is received, then in decision box 716, supervision may be required, depending on the current rate of detected defects 118 of the user 130. In such instances, an output is generated by the defects analysis application 140 that supervision is needed (box 719). If supervision is not needed, then in box 718, a list of exceptions is generated and rendered at the receiving station client 102 from which the user 130 may select. In box 720, the defects analysis application 140 receives a defects report 141 based on the exceptions selected by the user 130 in box 718. An image 120 of the defective parcel 124 is also received. In box 722, the vendor profile 116 associated with the defective parcel 124 is updated to reflect that a defect 118 was detected.

Figure 8:
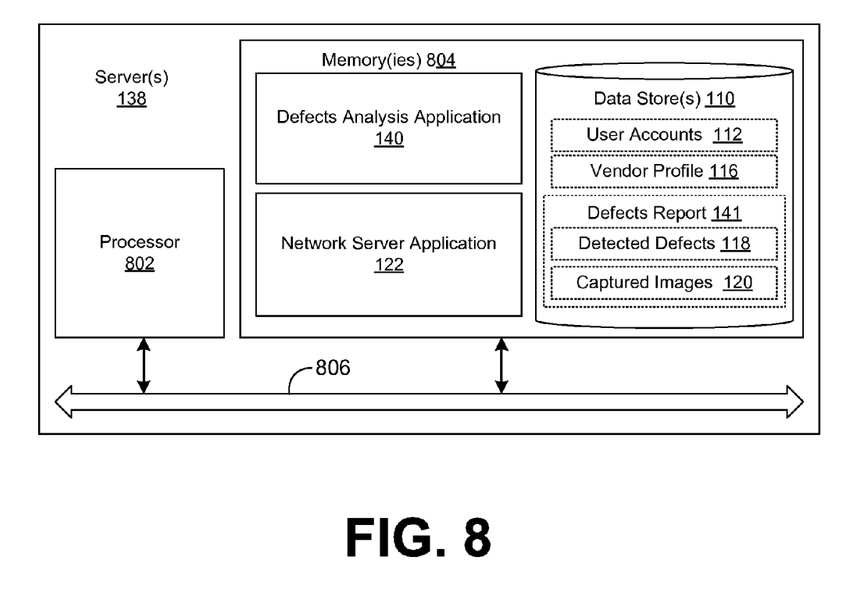
FIG. 8 is a schematic block diagram that provides one example illustration of a server employed in the networked environment of FIG. 1 according to an embodiment of the present disclosure.

Reference is now made to FIG. 8, which is a schematic block diagram of one example of a server 138 according to an embodiment of the present disclosure. The server 138 includes a processor circuit, for example, having a processor 802 and a memory 804, both of which are coupled to a local interface 806. To this end, the server 138 may comprise, for example, a server computer with such structure. The local interface 806 may comprise, for example, a data bus with an accompanying address/control bus or other bus structure as can be appreciated.

Stored in the memory 804 are both data and several components that are executable by the processor 802. In particular, stored in the memory 804 are the defects analysis application 140 and the network server application 122. In addition, a server operating system may be stored in the memory 804 and executed by the processor 802 as can be appreciated.

Also, user account information 112, defects reports 141, vendor profiles 116, detected defects 118, and captured images 120 of defects may be stored in the data store 110, for example, in the memory 804, or they may be stored in some other memory accessible to the server 138. It is understood that there may be other applications that are stored in the memory 804 and are executable by the processor 802 as can be appreciated. Also, other data may be stored in the memory 804 and accessed by the processor 802. Where any component discussed herein is implemented in the form of software, any one of a number of programming languages such as, for example, C, C++, Java, Java Script, Perl, Python, Flash, or other programming languages.

A number of software components are stored in the memory 804 and are executable by the processor 802. In this respect, the term "executable" means a program file that is in a form that can ultimately be run by the processor 802. Examples of executable programs may be, for example, a compiled program that can be translated into machine code in a format that can be loaded into a random access portion of the memory 804 and run by the processor 802, or source code that may be expressed in proper format such as object code that is capable of being loaded into a random access portion of the memory 804 and executed by the processor 802, etc. An executable program may be stored in any portion or component of the memory 804 including, for example, random access memory, read-only memory, a hard drive, compact disk (CD), floppy disk, or other memory components.

The memory 804 is defined herein as both volatile and nonvolatile memory and data storage components. Volatile components are those that do not retain data values upon loss of power. Nonvolatile components are those that retain data upon a loss of power. Thus, the memory 804 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 138 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 7 shows the functionality and operation of portions of the defects analysis application 140. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the defects analysis application 140 and/or any other component implemented in the server 138 as described above comprises software or code, the same can be embodied in any computer-readable medium for use by or in connection with an instruction execution system such as, for example, a processor in a computer system or other system. In this sense, the defects analysis application 140 and/or other components may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
   receiving a product in a materials handling facility on a first conveyor belt;
   capturing, in a vision tunnel positioned in the materials handling facility, a plurality of images of a plurality of sides of the product;
   extracting, from the plurality of images, a product identifier appearing within at least one of the plurality of images;
   identifying, from the plurality of images, a vendor profile associated with the product identifier;
   passing the product to an inventory area via the first conveyor belt in response to determining that a history of defects specified in the vendor profile is associated with a defect rate lower than a specified threshold;
   redirecting the product to a receiving station via a second conveyor belt based at least in part upon the history of defects specified in the vendor profile;
   retrieving from at least one server the vendor profile associated with the product identifier from a receiving station client, the product identifier being associated with a product undergoing inspection;
   performing an automated detection of defects;
   providing an indication in the vendor profile when at least one defect is detected;
   determining a level of inspection for the product based at least in part upon the history of defects specified in the vendor profile and in response, selecting an inspection sequence for a user to execute at the receiving station client;
   updating the vendor profile in response to a defect being detected by the user executing the inspection sequence;
   storing a defects report in a data store associated with the vendor profile, the defects report comprising a captured image of a defective product by at least one camera in communication with the receiving station client, the captured image representing a condition of the product;
   retrieving in the at least one server a user profile associated with the user from the data store, the user profile comprising a record of past performance by the user;
   determining a current rate of defects reported by the user, the current rate of defects being based on a number of defects reported by the user over a predetermined period of time; and
   performing a comparison between a past rate of erroneous detections by the user with an average rate of erroneous detections for a plurality of users and, based on the comparison, determining whether to supervise the user.

2. The method of claim 1, further comprising the steps of:
   determining a current rate of missed detections by the user, the current rate of missed detections being based on the number of defects missed by the user over the predetermined period of time; and
   performing the comparison between a past rate of missed defects by the user with an average rate of missed defects for the plurality of users and, based on the comparison, determining whether to supervise the user.

3. The method of claim 1, further comprising the steps of:
   generating at the at least one server a product defect identifier associated with the defective product; and
   outputting instructions directing the user to attach the product defect identifier to the defective product and to forward the product to a defects bin.

4. A method, comprising the steps of:
   receiving a product in a materials handling facility;
   capturing, in a vision tunnel positioned in the materials handling facility, a plurality of images of a plurality of sides of the product;
   extracting, from the plurality of images, a product identifier appearing within at least one of the plurality of images;
   identifying, from the plurality of images, a vendor profile from a data store, the vendor profile being associated with the product identifier;
   redirecting the product to a receiving station client based at least in part upon a history of defects specified in the vendor profile;
   retrieving by at least one server the vendor profile associated with the product identifier, the product identifier being associated with the product undergoing inspection;
   based at least in part on the retrieved vendor profile, selecting an inspection sequence for a user to execute, the inspection sequence being selected according to the history of defects specified in the vendor profile;
   generating instructions by the at least one server for the user of the receiving station client to capture an image of the product;
   sending the instructions to the receiving station client by way of a data communications network; and
   updating the vendor profile in response to a defects report being obtained from the receiving station client, the defects report comprising a captured image of a defective product by at least one camera in communication with the receiving station client, the captured image representing a condition of the product.

5. The method of claim 4, further comprising the steps of:
   generating instructions in the at least one server for the user to forward the product to an inventory for fulfillment when no defects reports are received from the receiving station client; and
   generating instructions in the at least one server for the user to forward the product to a defects bin when at least one defects report is received from the receiving station client.

6. The method of claim 5, further comprising the step of rendering the instructions at the receiving station client.

7. The method of claim 4, further comprising the step of retrieving in the at least one server a user profile associated with the user from the data store, the user profile comprising a record of a past performance of the user.

8. The method of claim 7, further comprising the steps of:
   determining whether supervision is needed based on the past performance of the user;
   upon determining that supervision is needed, halting further activity by the user at the receiving station client and generating an output indicating that supervision is needed; and
   updating the respective user profile in the data store to reflect that an output indicating that supervision is needed was generated.

9. The method of claim 8, wherein determining whether supervision is needed based on the past performance of the user comprises the steps of:
   determining a current rate of detected defects reported by the user, the current rate of detected defects being based at least in part on a number of defects reported by the user over a predetermined period of time; and
   examining a past rate of erroneous detections of the user.

10. The method of claim 9, wherein examining a past rate of erroneous detections of the user comprises the steps of:
    specifying a threshold based on comparing the past rate of erroneous detections of the user with an average rate of erroneous detections associated with a plurality of users; and
    determining whether supervision is needed by comparing the threshold and the current rate of defects reported by the user.

11. The method of claim 10, wherein determining whether supervision is needed comprises the steps of:
    determining that supervision is needed when the current rate of detected defects meets the threshold; and
    determining that supervision is not needed when the current rate of detected defects does not meet the threshold.

12. The method of claim 10, wherein specifying a threshold comprises the steps of:
    specifying a relatively low threshold when the past rate of erroneous detections of the user is greater than the average rate of erroneous detections; and
    specifying a relatively high threshold when the past rate of erroneous detections of the user is less than the average rate of erroneous detections.

13. The method of claim 10, wherein determining whether supervision is needed comprises the steps of:
    determining that supervision is needed when the current rate of missed defects is greater than the threshold; and
    determining that supervision is not needed when the current rate of missed defects is less than the threshold.

14. The method of claim 10, wherein specifying a threshold comprises the steps of:
    specifying a relatively low threshold when the past rate of missed defects of the user is greater than an average rate of missed defects; and
    specifying a relatively high threshold when the past rate of missed defects of the user is less than the average rate of missed defects.

15. The method of claim 9, wherein examining a past rate of missed defects of the user comprises the steps of:
    specifying a threshold based on comparing the past rate of missed defects of the user with an average rate of missed defects associated with a plurality of users; and
    determining whether supervision is needed by comparing the threshold and the current rate of missed defects by the user.

16. The method of claim 8, wherein determining whether supervision is needed based on the past performance of the user comprises the steps of:
    determining a current rate of missed defects reported by the user, the current rate of missed defects being based on a number of missed defects by the user over a predetermined period of time; and examining a past rate of missed defects of the user.

17. The method of claim 4, further comprising the steps of:
generating a list of exceptions for the user to select from, the list of exceptions corresponding to a list of possible defects; and
based on a selected exception by the user, responding to the selected exception from the user by providing the user with feedback for addressing the defect.

18. The method of claim 4, further comprising the steps of:
in the at least one server, generating a product defect identifier associated with a defective product; and
outputting instructions directing the user to attach the product defect identifier to the defective product.

19. The method of claim 4, further comprising the steps of performing an automated detection of defects and updating a respective one of the vendor profiles.

20. A system, comprising:
a first conveyor system;
a second conveyor system;
at least one server; and
a defects analysis application executable in the at least one server, the defects analysis application comprising:
  logic that captures a plurality of images of a plurality of sides of a product on the first conveyor system;
  logic that extracts a product identifier appearing within at least one of the plurality of images;
  logic that identifies, from the plurality of images, a vendor profile from a data store, the vendor profile being associated with the product identifier;
  logic that initiates redirection of the product to a receiving station client via the second conveyor system based at least in part upon a history of defects specified in the vendor profile;
  logic that retrieves the vendor profile associated with a defects report generated by a user performing product inspections at the receiving station client from a data store;
  logic that determines a level of scrutiny based at least in part on a history of past defects specified in the vendor profile and selects an inspection sequence for execution;
  logic that generates instructions for the user of the receiving station client to capture an image of the product; and
  logic that updates the vendor profile and generates a product defect identifier in response to a defects report being initiated by the user, the defects report comprising a captured image of the defective product by at least one camera in communication with the receiving station client, the captured image representing a condition of the product.

21. The system of claim 20, wherein the defects analysis application further comprises logic that retrieves from the data store in the at least one server a user profile associated with the user, the user profile comprising a record of past performance by the user.

22. The system of claim 20, wherein the defects analysis application further comprises:
logic that determines whether supervision is needed based on the past performance of the user;
logic that generates an output instructing the receiving client station to discontinue further activity by the user;
logic that generates an output indicating that supervision is needed; and
logic that updates a respective user profile in the data store to reflect that an output indicating that supervision is needed was generated.

* * * * *